between a series of rods 42 extending radially inward from the cylindrical shell. The mechanical working of the material in the device 28, in the presence of the substantial portion of dispersed crystals already present, enables further crystallization to take place rapidly but without crystal latticing, so that a relatively fluid stream issues through pipe 15.

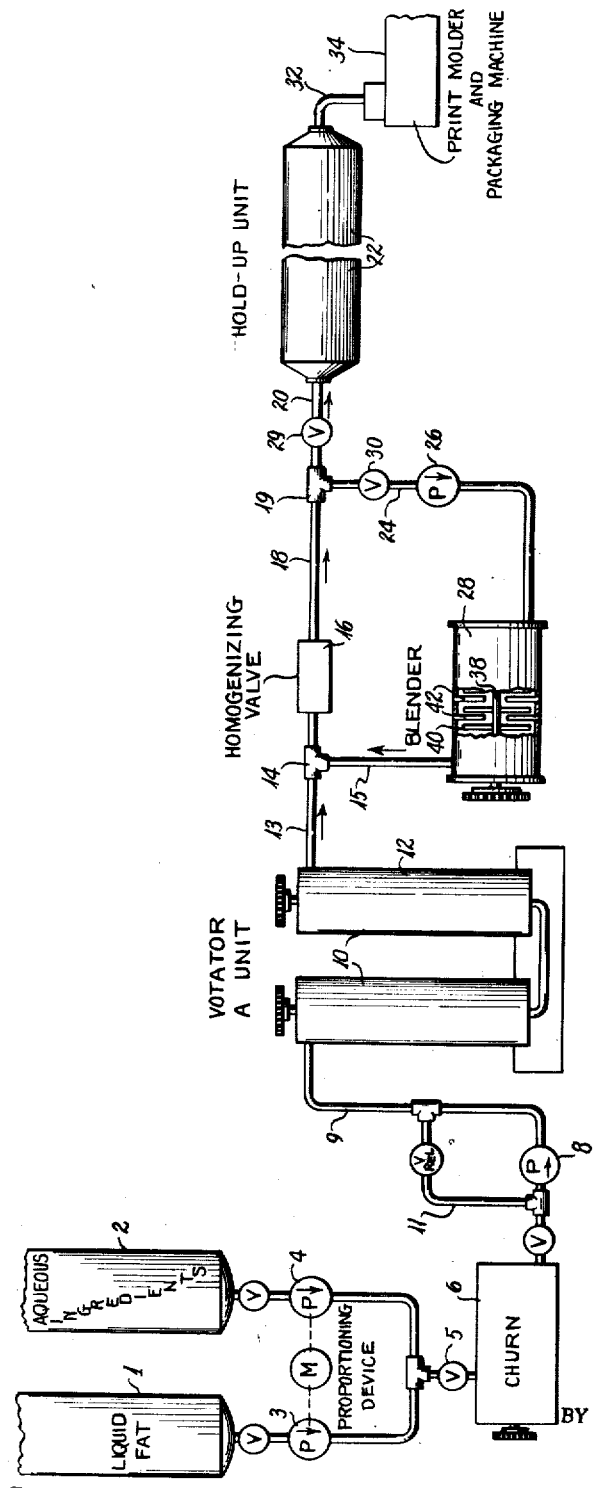

The following examples are illustrative of margarine production by the process described herein:

*Example I*

A liquid fat blend was prepared from the following components:

60% soya oil hydrogenated to a
  M. P. of_____ 38.0° C. (Wiley).
11% peanut oil hydrogenated to a
  M. P. of_____ 41.0° C. (Wiley).
11% peanut oil hydrogenated to a
  M. P. of_____ 32.0° C. (Wiley).
10% palm oil having a M. P. of 8%
  coconut oil_____ 40.0° C. (Wiley).

The Wiley melting point of the formulated material was 36.5° C.

The liquid fat and aqueous ingredients were mixed in a churn. The emulsion formed was processed as described. The following processing conditions were established:

Emulsion temperature in churn_____°F__ 110
Product issuing from the votator A unit_____°F__ 62
Product issuing from the blender_____°F__ 72
Blended streams after homogenization_____°F__ 65
Rise in temperature due to release of latent heat in
  the hold-up unit and in package_____°F__ 1
Percent recycle_____ 30
Ammonia back pressure_____p. s. i. g__ 50

This product was free of lumps and grains. It spread and colored easily at 55° F., and had a good break in the mouth. There was an immediate salt taste.

*Example II*

A liquid fat blend was prepared from the following components:

55% Menhaden oil hydrogenated to a
  M. P. of_____ 39.0° C. (Wiley).
20% cottonseed oil hydrogenated to a
  M. P. of_____ 32.0° C. (Wiley).
10% palm oil having a M. P. of____ 40.0° C. (Wiley).
5% cottonseed oil liquid.
10% coconut oil.

This formula had a melting point of 36.5° C. (Wley).
The oil and aqueous ingredients were mixed in a churn. The emulsion formed was processed as described. The following conditions were established:

Emulsion temperature in churn_____°F__ 120
Product issuing from the votator A unit_____°F__ 63
Product issuing from the blender_____°F__ 75
Blended streams after homogenization_____°F__ 68
Rise in temperature due to release of latent heat in
  hold-up unit and in package_____°F__ 0.5
Percent recycle_____ 42

The product produced by the modified process was free of lumps and colored and spread readily at 55° F.

The improvement in texture here over the conventional process was even more marked than that obtained in Example I—because Formula II contained hydrogenated Menhaden oil which in a conventional process gives a very lumpy product.

*Example III*

A liquid fat was prepared from the following components:

60% soya oil hydrogenated to a
  M. P. of_____ 37.0° C. (Wiley).
5% cottonseed oil hydrogenated to a
  M. P. of_____ 41.0° C. (Wiley).
9% cottonseed oil hydrogenated to a
  M. P. of_____ 32.0° C. (Wiley).
10% palm oil having a melting point of 40.0° C. (Wiley).
8% cottonseed oil.
8% coconut oil.

The Wiley M. P. of this formulated oil was 35.5° C.

The oil and aqueous ingredients were mixed in a churn. The emulsion formed was processed as described. The following processing conditions were established:

Emulsion temperature in churn_____°F__ 115
Product issuing from votator A unit_____°F__ 68
Product issuing from blender_____°F__ 78
Blended streams after homogenization_____°F__ 72
Rise in temperature due to release of latent heat in
  hold-up unit and in package_____°F__ 0.5
Percent recycle_____ 40
Ammonia back pressure_____p. s. i. g__ 35

*Example IV*

A liquid fat was prepared from the following components:

55% herring oil hydrogenated to a
  M. P. of_____ 39.0° C. (Wiley).
13% peanut oil hydrogenated to a
  M. P. of_____ 41.0° C. (Wiley).
14% peanut oil hydrogenated to a
  M. P. of_____ 32.0° C. (Wiley).
10% palm oil having a melting point of 40.0° C. (Wiley).
8% coconut oil.

The Wiley M. P. of this formulated oil was 37.0° C.
The oil and aqueous ingredients were mixed in a churn. The emulsion formed was processed as described. The following processing conditions were established:

Emulsion temperature in churn_____° F__ 120
Product issuing from votator A unit_____° F__ 64
Product issuing from blender_____° F__ 74
Blended stream after homogenization_____° F__ 69
Percent recycle_____ 50
Ammonia back pressure_____p. s. i. g__ 40

The margarine products produced in Examples III and IV were very similar to those produced in Examples I and II respectively.

It will be seen from the foregoing description and examples that there has been provided an improved continuous process for manufacture of margarine of a very desirable texture, having excellent spreading and coloring properties even at relatively low temperature, but which may be readily molded into prints and packaged, and that such process permits wide variations in the types of liquid fat blends that can be utilized to produce margarine of substantially the same uniform texture and consistency.

We claim:

1. A process for margarine manufacture, comprising: mixing liquid fat and aqueous ingredients to form an emulsion, continuously passing said emulsion through a chilling stage to provide a super-cooled slurry stream in which crystallization is initiated, intimately blending the freshly chilled slurry issuing from said chilling stage with a recycled portion of slurry which has been subjected to mechanical working, passing a portion of said blended slurry to a hold-up zone for completion of crystallization under quiescent conditions, and subjecting another portion of said blended slurry to mechanical working to provide said recycled portion for admixture with said freshly chilled slurry.

2. The process as defined in claim 1, wherein the recycled portion is approximately one-quarter to three-quarters of the total blended slurry.

3. The process as defined in claim 1, wherein said liquid fat ingredients comprise a blend of hydrogenated and natural vegetable oils.

4. The process as defined in claim 1, wherein said liquid fat ingredients comprise a blend of natural and hydrogenated vegetable oils and hydrogenated fish oils.

5. The process as defined in claim 1, wherein a major portion of said liquid fat ingredients comprise hydrogenated fish oil.

6. The process as defined in claim 5, wherein said hydrogenated fish oil is hydrogenated Menhaden oil.

7. The process as defined in claim 5, wherein said hydrogenated fish oil is hydrogenated herring oil.

8. The process in claim 1, wherein the temperature of the freshly chilled slurry issuing from the chilling stage is in the range of about 60° to 70° F., the temperature of the blended slurry is about 65° to 75° F., and the temperature rise in the holding stage is less than about 1° F.

9. A process for margarine manufacture, comprising: mixing liquid fat and aqueous ingredients to form an emulsion, continuously forcing said emulsion through a chilling stage to provide a supercooled slurry stream in which crystallization is initiated, combining said slurry stream with a recycled stream of slurry having a higher temperature and in which crystallization has been substantially completed, homogenizing the combined slurry stream to provide a slurry stream having a relatively large quantity of fat crystals intimately dispersed in uncrystallized material, passing a portion of said homogenized slurry into a hold-up zone for completion of crystallization under relatively quiescent conditions, forming the resultant crystallized material into shaped portions, and subjecting another portion of said homogenized slurry to mechanical working to provide said recycled stream for admixture with said supercooled slurry.

No references cited.

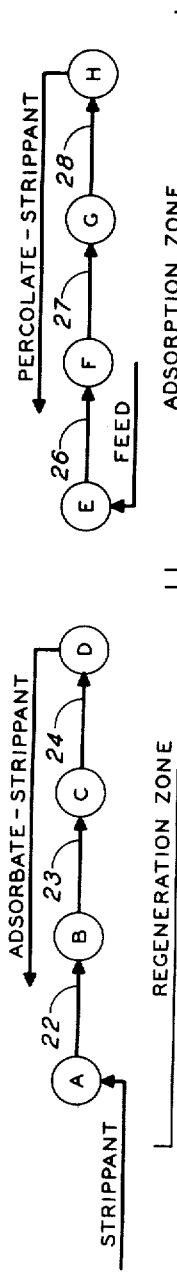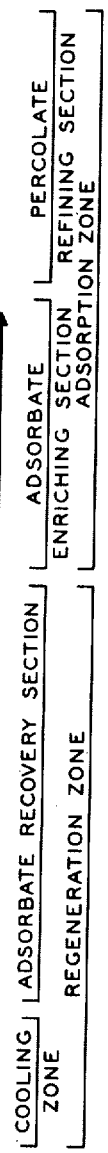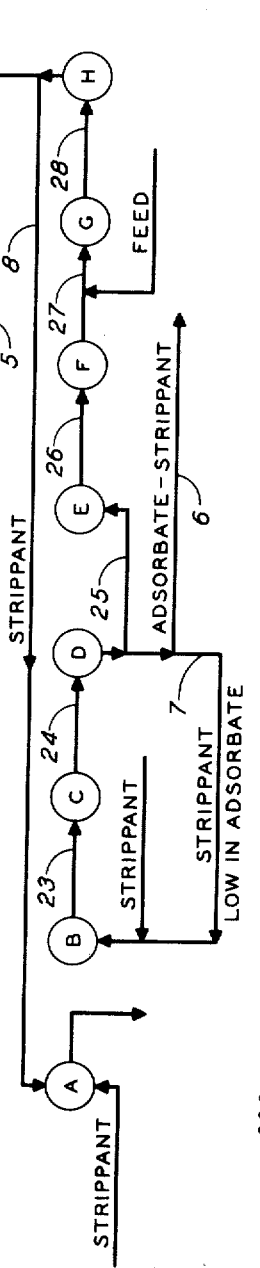

UNITED STATES PATENT OFFICE
CERTIFICATE OF CORRECTION

Patent No. 2,797,164                                                 June 25, 1957

Raymond J. McGowan et al.

It is hereby certified that error appears in the printed specification of the above numbered patent requiring correction and that the said Letters Patent should read as corrected below.

Column 5, line 21 and 22 should appear as shown below instead of as in the patent—

10% palm oil having a M.P. of------------------40.0° C. (Wiley).
    8% coconut oil.

Signed and sealed this 27th day of August 1957.

(SEAL)
Attest:
KARL H. AXLINE
Attesting Officer

ROBERT C. WATSON
                                                                       Commissioner of Patents